United States Patent [19]

Wycheck et al.

[11] 4,053,720
[45] Oct. 11, 1977

[54] AUTOMATIC EXCLUSION CIRCUIT

[75] Inventors: Thomas Joseph Wycheck; George Edward Leibich, both of Harrisburg, Pa.

[73] Assignee: International Telephone and Telegraph Corporation, Nutley, N.J.

[21] Appl. No.: 636,855

[22] Filed: Dec. 2, 1975

[51] Int. Cl.² ............................................. H04M 1/68
[52] U.S. Cl. .................................... 179/99; 179/17 B; 179/38
[58] Field of Search .................. 179/99, 18 DA, 17 B, 179/8 AD, 38

[56] References Cited

U.S. PATENT DOCUMENTS

| | | | |
|---|---|---|---|
| 3,514,544 | 5/1970 | Chambers, Jr. | 179/17 B |
| 3,591,725 | 7/1971 | Morse et al. | 179/18 AD |
| 3,725,601 | 4/1973 | Jetzt et al. | 179/99 |
| 3,860,763 | 1/1975 | Sudoh et al. | 179/18 DA |
| 3,941,943 | 3/1976 | Matheny | 179/99 |
| 3,961,144 | 6/1976 | Hirate | 179/99 |
| 3,967,076 | 6/1976 | Balzer | 179/99 |

*Primary Examiner*—Kathleen H. Claffy
*Assistant Examiner*—Gerald L. Brigance
*Attorney, Agent, or Firm*—John T. O'Halloran; Alfred C. Hill

[57] ABSTRACT

A relay is included in a subset of a key telephone system to connect the subset to a line selected by the line button of the system when the relay is activated. A control circuit is coupled to the relay and a key system positive ground to control the operation of the relay. The "A" lead of the key telephone system is coupled to the control circuit to disable the control circuit and, hence, the relay when the positive ground is coupled into the subset on the "A" lead and to enable the operation of the control circuit and, hence, actuation of the relay when the positive ground is not coupled into the subset on the "A" lead.

11 Claims, 1 Drawing Figure

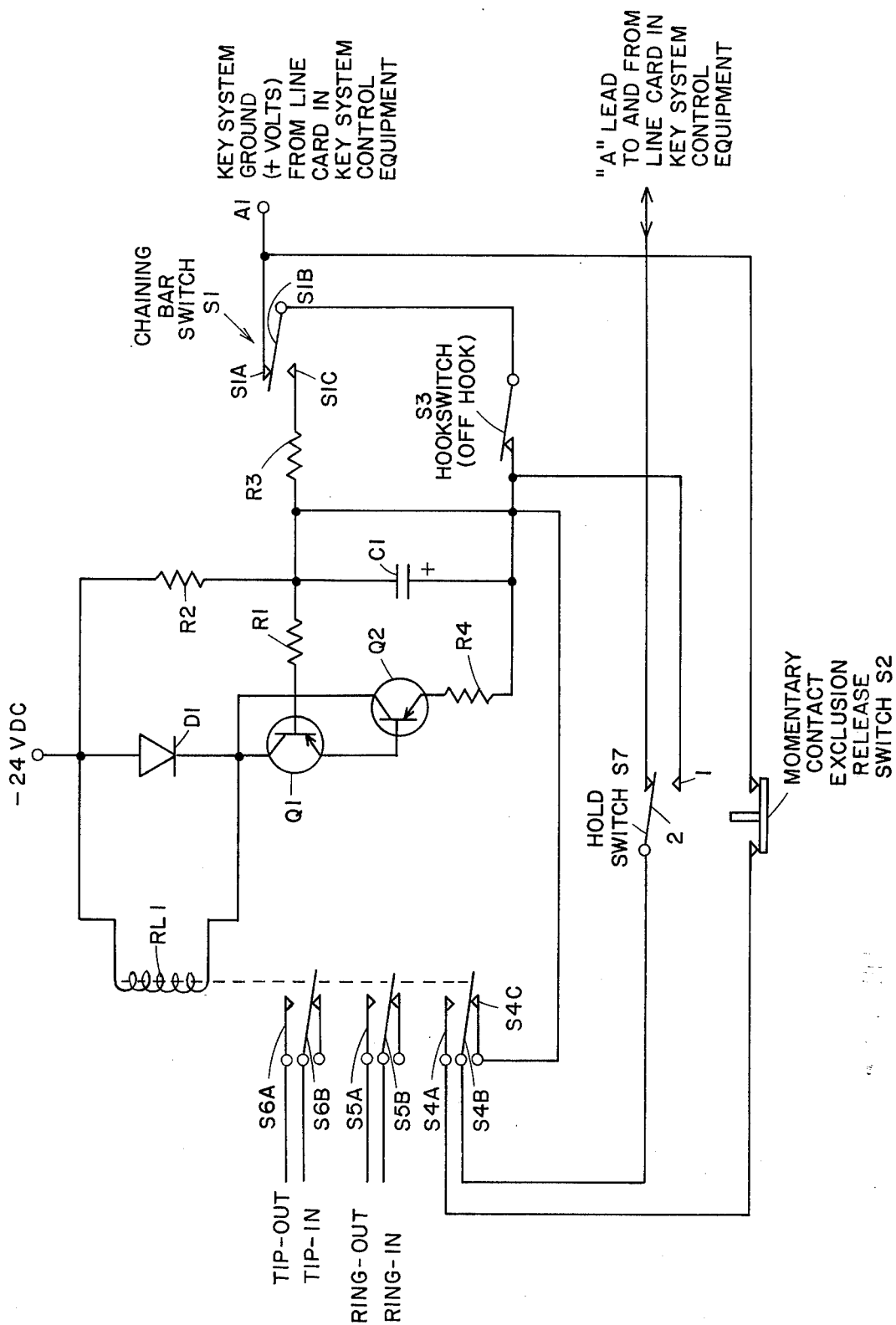

AUTOMATIC EXCLUSION CIRCUIT

BACKGROUND OF THE INVENTION

This invention relates to telephone systems and more particularly to an exclusion circuit contained in a subset of a key telephone system.

Exclusion circuits are incorporated in key telephone systems to prevent a subset from connecting a line that is already occupied.

Exclusion circuits may be automatic or manual. Some existing automatic exclusion circuits are dependent on central office or interface line voltage as a means of sensing line occupation. Others employ elaborate multiple relay switching arrangements that sense "A" lead conditions of a key telephone system. Manual exclusion circuits require remote manipulation to operate.

There are several shortcomings of the above-mentioned prior art exclusion circuits. Central office line voltage sensing circuits are dependent on central office line voltage. High or low central office voltage will cause the exclusion circuit to malfunction. Multiple relay switching arrangements are dependent on operation time of the relays. A multitude of relays may jeopardize the efficiency and reliability of the exclusion circuit, as well as increasing its cost and size.

SUMMARY OF THE INVENTION

An object of the present invention is to provide a simple automatic exclusion circuit to overcome the above-mentioned disadvantages of the prior art exclusion circuits.

The above object is achieved by the use of only one relay and a time delay circuit. An equipped telephone subset is automatically excluded when that subset attempts to access an occupied line.

A feature of the present invention is the provision of an automatic exclusion circuit for a subset of a key telephone system comprising: a relay to connect the subset to a selected line of the key telephone system when the relay is activated; a first source of key system positive ground; a control circuit coupled to the relay and the first source to control the operation of the relay; and an "A" lead coupled to the control circuit, the "A" lead disabling the control circuit and, hence, the relay when the key system positive ground is coupled into the subset on the "A" lead and enabling the operation of the control circuit and, hence, activation of the relay when the key system positive ground is not coupled into the subset on the "A" lead.

BRIEF DESCRIPTION OF THE DRAWING

The above-mentioned and other features and objects of this invention and the manner of obtaining them will become more apparent by reference to the following description taken in conjunction with the drawing, the single FIGURE of which is a schematic diagram of an automatic exclusion circuit contained in a subset of a key telephone system in accordance with the principles of the present invention.

DESCRIPTION OF THE PREFERRED EMBODIMENT

During the course of the following description and when reading the claim, it should be remembered that due to the design and operation of a key telephone system ground in such a system is a positive voltage and is referred to herein as a key telephone system ground or positive ground.

PNP transistors Q1 and Q2 have their electrodes interconnected as illustrated in the Figure to form a Darlington pair circuit with relay RL1 in the collector circuit of both of these transistors. Diode D1 acts as a commutator diode for relay RL1. A negative 24 volts DC (direct current) is applied to the circuit as illustrated. Capacitor C1 and resistor R2 provides an RC (resistor-capacitor) time constant to provide a time delay for the Darlington circuit. The purpose of this time delay circuit is to prevent switch bounce of any of the switches connected in the illustrated circuit or any switches connected in any manner to the circuit to affect the operation of the Darlington circuit. Resistor R1 is a base current limiting resistor for transistor Q1 and resistor R3 provides a discharge path for capacitor C1. Resistor R4 is a pull-up resistor for the base voltage of transistor Q1.

When a subset with the exclusion circuit of the present invention contained therein is removed off-hook, a positive ground is placed on the emitter electrode of transistor Q2 via A1, contact S1A and armature S1B of chaining bar switch S1, the hookswitch S3 and resistor R4. This positive ground on the emitter of transistor Q2 sets bias potential for transistors Q1 and Q2. Positive ground is also placed on the positive side of electrolytic capacitor C1. As a result capacitor C1 will charge via resistor R2 with the base electrode of transistor Q1 more negative with respect to its emitter electrode. After approximately 52 milliseconds current will flow via resistor R1 to the base electrode of transistor Q1. This will forward bias transistors Q1 and Q2 causing actuation of relay RL1. Relay RL1 will remain activated provided capacitor C1 is charged. Power, or in other words positive ground, removal will release or deactivate relay RL1. It should be noted that as illustrated relay RL1 is a 3 pole double throw relay. However, in a successful reduction to practice RL1 was actually a 4 pole double throw relay with one of the poles being unused.

Pressing a line button will operate chaining bar switch S1. When switch S1 is operated armature S1B will break from contact S1A which removes power or positive ground from the circuit. Armature S1B will then make contact with contact S1C which discharges capacitor C1 via resistor R3. After the line button has been fully depressed, armature S1B will again make contact with contact S1A, thereby applying power or positive ground to the circuit. Provided there are no other subsets off-hook on the selected line, as indicated by the absence of positive ground coupled into the subset on the "A" lead, relay RL1 will be actuated as described hereinabove. Actuation of relay RL1 will provide a connection between the TIP-IN conductor and TIP-OUT conductor via armature S6B and contact S6A and a connection between the RING-IN conductor and the RING-OUT conductor via armature S5B and contact S5A. Also when relay RL1 is actuated armature S4B will contact contact S4A which results in placing a positive ground on the "A" lead for coupling out of the subset to exclude other subsets from the occupied line. The positive ground is placed on the "A" lead via A1, momentary contact exclusion release switch S2 and hold switch S7. Pressing switch S2 removes the positive ground on the "A" lead, thereby releasing exclusion of other subsets from the selected line.

With relay RL1 in a deactivated condition, a positive ground coupled into the subset on the "A" lead, which indicates that the selected line is occupied, will be coupled to the junction of resistors R1, R2 and R3 and capacitor C1 via hold switch S7, armature S4B and contact S4C. This positive ground will prevent capacitor C1 from charging and thus prevents the actuation of relay RL1. Pressing the hold button will operate hold switch S7. When switch S7 is operated a positive ground is placed at the junction of resistors R1, R2 and R3 and capacitor C1 via A1, contact S1A and armature S1B of chaining bar switch S1, hookswitch S3, contact 1 and armature 2 of hold switch S7, armature S4B and contact S4C. This positive ground will prevent actuation of RL1 by pressing the hold button. When the positive ground is no longer coupled into the subset on the "A" lead, the excluded subset is released, capacitor C1 can charge and RL1 will be actuated, thereby providing a connection between the TIP-IN and TIP-OUT conductors and a connection between the RING-IN and RING-OUT conductors as previously described hereinabove.

The automatic exclusion circuit of the present invention was designed specifically to operate within a key subset as a private exclusion device for key telephone systems. However, the exclusion circuit disclosed herein is not limited to only this application. It may be employed in conjunction with other devices that are "A" lead or positive ground controlled.

The values and types of components employed in the Figure of a successful reduction to practice are set forth hereinbelow.

| R1 | 20 K ohm ½ Watt Resistor |
|----|--------------------------|
| R2 | 100 K ohm ½ Watt Resistor |
| R3 | 47 ohm ½ Watt Resistor |
| R4 | 75 ohm ½ Watt Resistor |
| C1 | 5.6 mfd 35 V Capacitor |
| D1 | GR22 Diode |
| Q1, Q2 | 2N3645 Transistor |
| S1 | SPDT Switch |
| S2 | Normally closed momentary contact switch |
| RL1 | 4 PDT Relay |

While we have described above the principles of our invention in connection with specific apparatus it is to be clearly understood that this description is made only by way of example and not as a limitation to the scope of our invention as set forth in the objects thereof and in the accompanying claims.

We claim:
1. An automatic exclusion circuit for a subset of a key telephone system comprising:
   a relay to connect said subset to a selected line of said key telephone system when said relay is activated;
   a first source of key system positive ground;
   a control circuit coupled to said relay and said first source to control the operation of said relay; and
   an "A" lead coupled to said control circuit, said "A" lead disabling said control circuit and, hence, said relay when said key system positive ground is coupled into said subset on said "A" lead and enabling the operation of said control circuit and, hence, activation of said relay when said key system positive ground is not coupled into said subset on said "A" lead;
   said control circuit including
   a pair of transistors each having base, emitter and collector electrodes interconnected to form a Darlington pair circuit,
   a second source of operation potential,
   said relay being connected between the collector electrodes of said pair of transistors and said second source,
   a diode connected in shunt relation to said relay,
   a first resistor having one terminal coupled to the base electrode of one of said pair of transistors,
   a second resistor having one terminal connected to the emitter electrode of the other of said pair of transistors,
   a capacitor having one terminal connected to the other terminal of said second resistor and the other terminal connected to the other terminal of said first resistor, and
   a third resistor having one terminal connected to the other terminal of said capacitor and the other terminal connected to said second source,
   said capacitor and said third resistor provide a time delay circuit for said control circuit.

2. An automatic exclusion circuit according to claim 1, wherein
   each of said pair of transistors is a PNP transistor, and said operating voltage is a negative voltage.

3. An automatic exclusion circuit according to claim 1, wherein said "A" lead is connected to the other terminal of said capacitor.

4. An automatic exclusion circuit according to claim 1, wherein
   said relay includes
      a first set of contacts to connect an input tip conductor to an output tip conductor when said relay is activated,
      a second set of contacts to connect an input ring conductor to an output ring conductor when said relay is activated, and
      a third set of contacts to connect said "A" lead to the other terminal of said capacitor when said relay is inoperative and to connect said first source to said "A" lead when said relay is activated to couple said key system positive ground out of said subset.

5. An automatic exclusion circuit according to claim 4, further including
   an exclusion release switch connected between said third set of contacts and said first source.

6. An automatic exclusion circuit according to claim 5, wherein
   said release switch is a momentary contact switch.

7. An automatic exclusion circuit according to claim 5, further including
   a hold switch having a first armature connected to said third set of contacts, a first contact connected to said "A" lead and a second contact coupled to the one terminal of said capacitor.

8. An automatic exclusion circuit according to claim 7, further including
   a hookswitch having a third contact coupled to the one terminal of said capacitor and a second armature coupled to said first source.

9. An automatic exclusion circuit according to claim 8, further including
   a fourth resistor having one terminal coupled to the other terminal of said capacitor, and
   a chaining bar switch having a fourth contact coupled to the other terminal of said fourth resistor, a fifth contact coupled to said first source and a third armature normally coupled between said fifth contact and said second armature.

10. An automatic exclusion circuit according to claim 1, further including
a hookswitch having a first contact coupled to the one terminal of said capacitor and a first armature coupled to said first source.

11. An automatic exclusion circuit according to claim 10, further including
a fourth resistor having one terminal coupled to the other terminal of said capacitor, and
a chaining bar switch having a second contact coupled to the other terminal of said fourth resistor, a third contact coupled to said first source and a second armature normally coupled between said third contact and said first armature.

* * * * *